United States Patent [19]

Stephens et al.

[11] 3,926,788

[45] Dec. 16, 1975

[54] FLUX RECOVERY UNIT

[76] Inventors: Galen H. Stephens, 108 J.J. Lemon, Hutchins, Tex. 75141; Charles L. Revill, 1102 Falcon, Irving, Tex. 75060

[22] Filed: May 31, 1974

[21] Appl. No.: 474,917

[52] U.S. Cl. ..................... 209/3; 209/250; 55/465; 241/40
[51] Int. Cl.² ......................................... B07B 13/16
[58] Field of Search ............. 209/3, 250, 21, 30, 31, 209/243, 247; 55/320, 334, 434, 462, 465, 321, 315; 15/409, 353; 228/20; 219/73, 76; 241/274, 40

[56] References Cited
UNITED STATES PATENTS

| | | | |
|---|---|---|---|
| 1,817,337 | 8/1931 | Baker | 15/409 X |
| 1,985,157 | 12/1934 | Friedman et al. | 55/320 X |
| 2,690,493 | 9/1954 | Schaefer | 209/144 X |
| 3,305,414 | 2/1967 | Hodgson | 241/40 X |
| 3,543,325 | 12/1970 | Hamrick | 15/314 |
| 3,618,297 | 11/1971 | Hamrick | 55/320 X |
| 3,662,886 | 5/1972 | Kennedy | 209/250 |
| 3,703,957 | 11/1972 | Swanson et al. | 209/144 |
| 3,804,245 | 4/1974 | Pendleton | 209/250 X |

*Primary Examiner*—Frank W. Lutter
*Assistant Examiner*—Ralph J. Hill
*Attorney, Agent, or Firm*—Richards, Harris & Medlock

[57] ABSTRACT

Disclosed is a welding apparatus having a flux hopper with a flux recovery unit attached over the open top of the hopper. A venturi chamber is formed in the unit and is connected to a source of pressurized gas and to a flux return conduit. The venturi chamber communicates with a chamber having a vertical wall positioned in the path of the flow entering the chamber. This chamber communicates with another chamber also having a vertical wall positioned in the path of the flow. This chamber in turn communicates with an enlarged settling chamber. A gas vent is formed in the upper end of the settling chamber to allow gas to escape therefrom and flow through a filter. The lower end of the enlarged chamber communicates directly with the flux hopper, and a screen is positioned across the path of flow into the hopper.

15 Claims, 6 Drawing Figures

FLUX RECOVERY UNIT

BACKGROUND OF THE INVENTION

The present invention relates to welding apparatus used in sub arc type welding processes, and the like. More particularly, the present invention relates to improvements in apparatus for reclaiming the flux material used in the sub arc welding process.

In some welding applications, it is desirable to use a sub arc process wherein the arc is protected from the atmosphere while the weld is being formed. In the sub arc welding process, flux material is placed on the workpiece in the area to be welded and the arc is struck and maintained within this flux material.

Although this process of welding has many advantages, it is expensive, in that large volumes of flux material are used during the process. To eliminate this disadvantage, a system for recovering the unused flux is used wherein a vacuum is created in a conduit and the open end of the conduit is passed over the weld after the weld is completed to remove unused flux material remaining on the workpiece. The flux material passes through the conduit and is returned to a flux hopper for reuse. Although these flux recovery systems have reduced the amount of flux used in the welding process, problems have arisen in these recovery systems. For example, the particulate flux material is abrasive and when transported in a moving stream of air, damage to the equipment can occur. Also, during the welding process, the flux particles can fuse together forming enlarged particles of flux, which if returned to the hopper, can plug up or damage the flux dispensing equipment. In addition, waste materials, such as scraps of metal, portions of welding rod, and the like, can become mixed with the flux. This waste material can also harm the flux dispensing equipment.

SUMMARY OF THE INVENTION

Therefore, according to the present invention, an improved flux recovery unit is provided for attachment to a flux hopper. The improved unit separates flux from a moving stream of air by directing the stream against vertically-extending walls. This process causes the fused flux particles to break up and separates the flux from the flowing stream of air.

According to another aspect of the present invention, an improved flux recovery unit is provided for mounting on a flux hopper of a welding apparatus. A housing defines a settling chamber with an access door for allowing the addition or removal of flux material. A gas discharge port is provided in the housing adjacent the upper end thereof. A conduit extends from the port for attachment of a filter bag thereto. A valve has an inlet port thereon attached to a supply of pressurized air. The valve can be manipulated to control the flow of air into a plenum chamber. the plenum chamber is connected to a flux return conduit to create a vacuum in the conduit to cause flux to flow through the conduit in a direction to said recovery unit. The plenum communicates with a first flux separation chamber wherein the flow is directed against a first vertically-extending wall covered with a resilient material. The flow leaves the first chamber and enters a second chamber. The flow is directed against a second vertically-extending baffle having a resilient material thereon. The flow leaves the second chamber in a vertically downward direction and enters the settling chamber wherein the flux flows in a vertically downward direction toward the flux hopper. A screen is mounted across the flow path of the flux leaving the settling chamber to prevent large particles from entering the flux hopper.

The exact nature of this invention, as well as the objects and advantages thereof, will be readily apparent to those of ordinary skill in the art from a consideration of the following specification relating to the annexed Drawings in which:

DESCRIPTION OF THE PREFERRED EMBODIMENT

Figure 1:
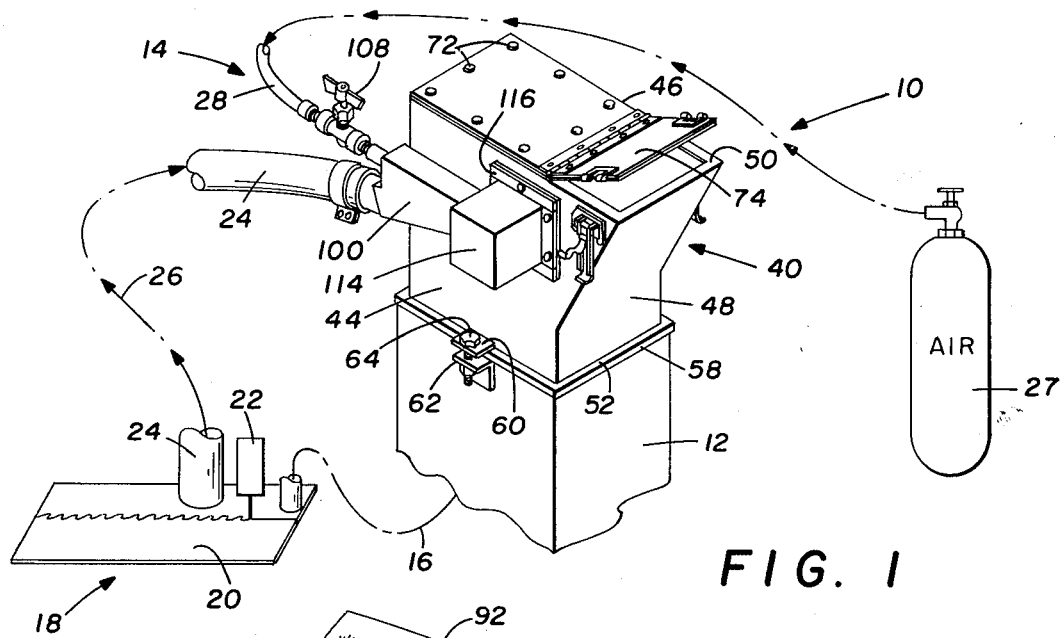
FIG. 1 is a perspective view of a welding apparatus with the improved flux recovery apparatus of the present invention illustrated attached to the flux hopper of the welding apparatus and illustrated schematically attached to a source of pressurized air and a flux return line.
Figure 2:
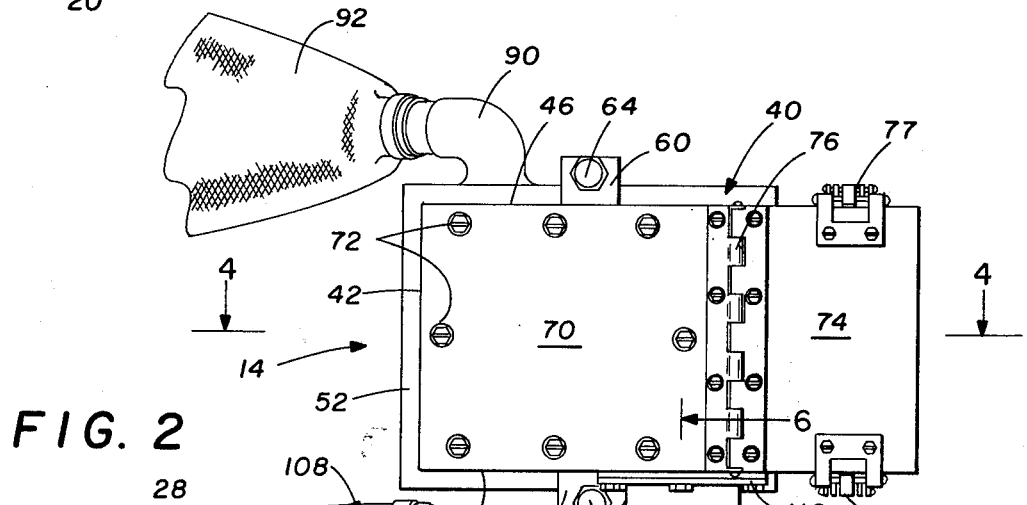
FIG. 2 is a plan view of the apparatus illustrated in FIG. 1.
Figure 3:
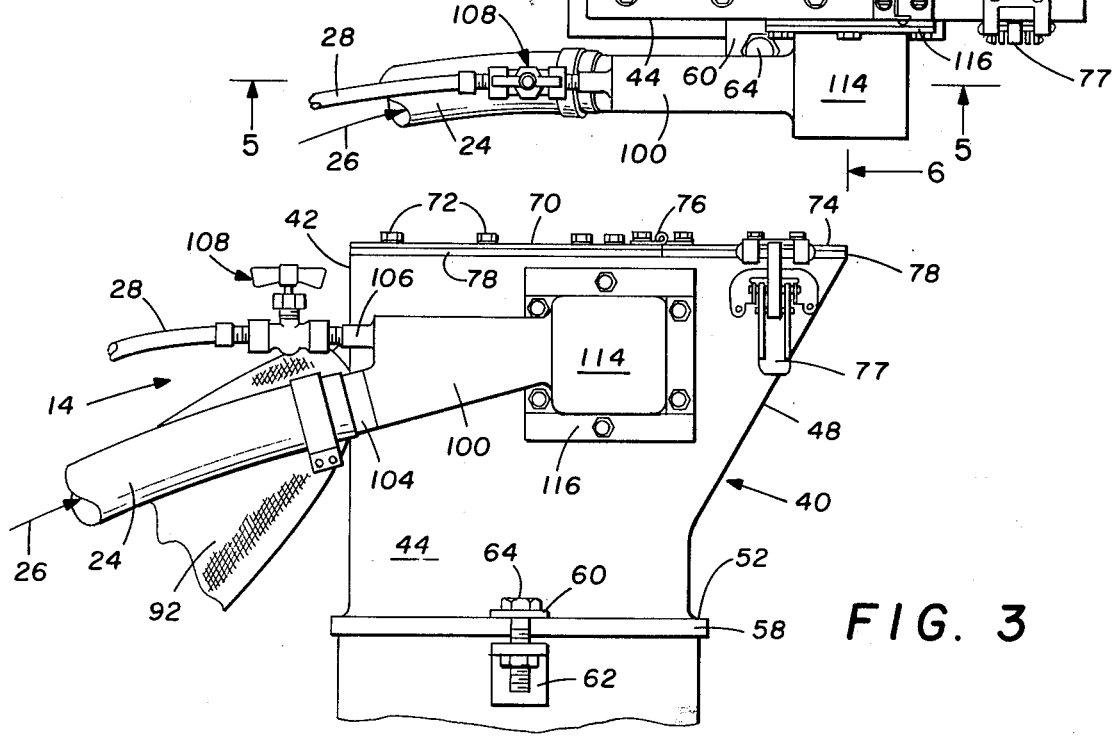
FIG. 3 is a front elevation of the apparatus illustrated in FIG. 1.

Referring now to the Drawings wherein like reference characters designate like or corresponding parts throughout the several views, there is illustrated in FIG. 1, a welding apparatus which is designated for purposes of description by reference numeral 10. The welding apparatus 10 is of the type which can be used in sub arc type welding processes wherein the weld is formed within the environment of a welding flux material.

The apparatus 10 has a top fill flux hopper 12 for use in storing a volume of flux material. Attached adjacent the top of the hopper 12 is the improved flux recovery unit 14 of the present invention. This unit 14 is used to return unused flux to the hopper 12. The hopper 12 has a discharge conduit 16 for transporting flux from the hopper to be dispensed onto the workpiece 20 at a weld station 18. The workpiece 20 is welded by a welding head 22 shown schematically. It is to be understood, of course, that the welding apparatus is conventional such as that marketed by Lincoln Arc Welding Co. under the model and number of LAF-3, and that the welding head 22 is of a conventional design.

According to a particular feature of the present invention, a flux return conduit 24 is positioned adjacent to the weld head 22. As will be hereinafter described, the conduit 24 is evacuated at one end to cause flux to enter the conduit and flow in the direction of arrows 26 up to the flux recovery unit 14. A supply of pressurized gas, such as air, shown schematically as an air tank 27, is connected by conduit 28 to recovery unit 14 for the purpose of creating a vacuum within the conduit 24.

Turning now to FIGS. 2 through 6, the detail structure of the flux recovery unit 14 will be described. The flux recovery unit 14 has a housing 40 which can be assembled in any suitable manner from materials of sufficient strength and durability to operate in the environment of their use. In the preferred embodiment, steel materials are used in the construction of the housing 40. The housing 40 is formed by welding side walls 44 and 46 to a rear wall 42 and an inclined front wall 48. These walls are welded together along their edges and an internally-extending flange 50 is formed along the upper edges thereof. An externally-extending flange 52 is likewise formed along the lower edges of these walls. The flange 52 defines a flux exit port 54 and is of a size and shape to allow the mounting of the recovery unit 14 on the top of the hopper 12 of a welding apparatus. A suitable gasket 56 and downturned flange portion 58 can be provided to allow sealing engagement with the upper end of the hopper 12.

Flanges 60 are provided on the exterior of housing 40. Angle irons 62 can be fastened to the outside of the flux hopper 12 so that fastener 64 can be used to rigidly attach the unit 14 onto the hipper 12, as shown.

A top wall 70 can be removably attached to the flange 50 on the upper end of housing 40 by means of fasteners 72. A suitable gasket 78 may be positioned between wall 70 and flange 50 to seal therebetween. A portion of the top wall 70 forms an access door 74. Door 74 is attached to top wall 70 by means of a piano hinge 76 to allow access to the interior of the housing 40. A pair of snap-lock assemblies 77 have been provided on the outside of walls 44 and 46 to engage the door 74 and hold the same in a shut position.

Figure 4:
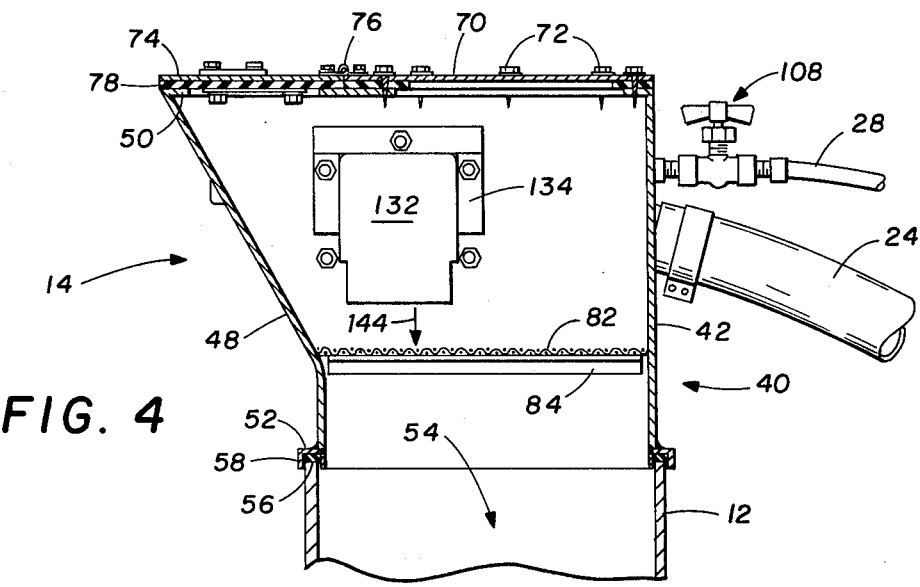
FIG. 4 is a vertical section of the apparatus taken on line 4—4 of FIG. 2, looking in the direction of the arrows.
Figure 5:
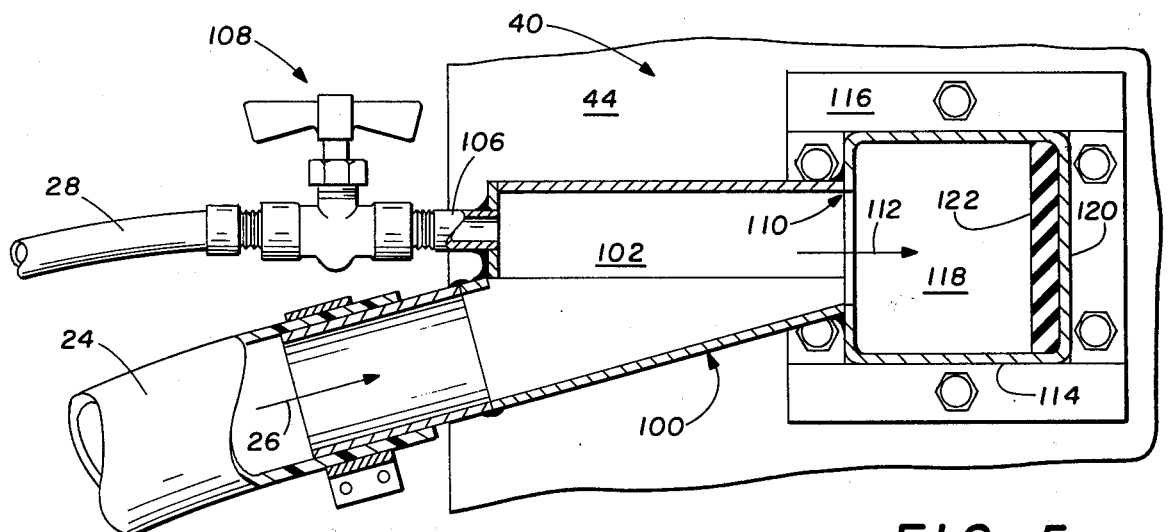
FIG. 5 is a vertical section of the apparatus taken on line 5—5 of FIG. 2, looking in the direction of the arrows.
Figure 6:
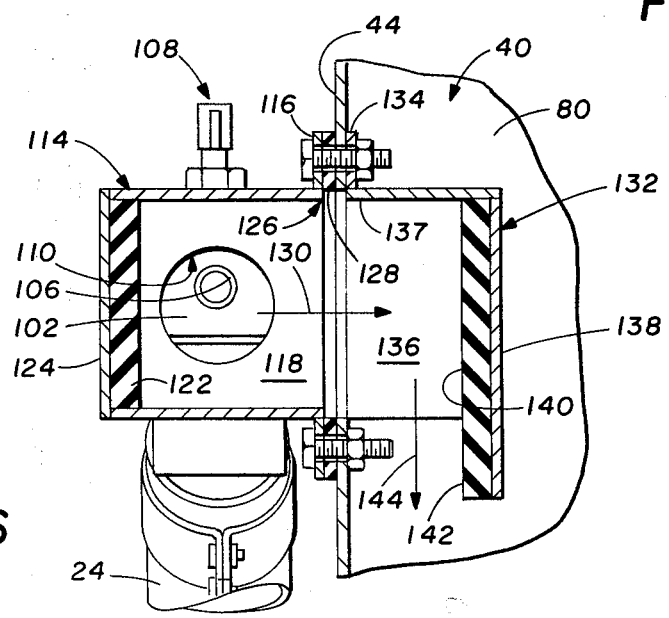
FIG. 6 is a vertical section of the apparatus taken on line 6—6 of FIG. 2, looking in the direction of the arrows.

As illustrated in FIG. 4, the housihg 40 defines a settling chamber 80. A screen 82 is positioned within the chamber 80. Screen 82 rests on angle irons 84 fastened inside walls 44 and 46. This screen extends completely across the flux exit port 54.

A gas discharge port is formed in side wall 46 adjacent the upper edge thereof. This gas discharge port communicates with a conduit 90. A filter bag 92 is connected over the end of the conduit 90. Gas can escape from the chamber 80 through the conduit 90 and is filtered through the bag 92.

The flux return conduit 24 has one end connected to a housing 100. This housing is supported on the exterior of the housing 40 and has a plenum chamber 102 therein. The housing 100 has a male fitting 104 to which the conduit 24 is attached. This male fitting 104 communicates with the interior of the plenum 102.

A second male fitting 106 likewise communicates with plenum 102. A valve 108 is connected to the fitting 106 and can be adjusted to control the flow therethrough.. Conduit 28 is connected to the valve 108, and thus by adjusting the valve 108, the supply of pressurized air to plenum chamber 102 can be controlled.

The plenum chamber 102 is conventional in design, it being understood, of course, that by injecting pressurized gas into plenum 102 through fitting 106 that a low pressure will be created within the plenum 102. This low or reduced pressure creates a vacuum within the conduit 24, thus causing the flux to be lifted from the workpiece 20 and transported through the conduit in the direction of arrows 26.

The mixture of air and flux then flows from the plenum 102 and through a port 110. This flow next moves in a horizontal direction as shown by arrow 112 into a housing 114. Housing 114 is provided with external flanges 116 releasably attaching the housing to the exterior of the wall 44. The housing 114 defines a chamber 118 having a vertical rear wall 120 which is positioned directly in the path of the direction of flow 112. This rear wall 120 extends across the path of flow entering the chamber 118. A resilient material 122 can be attached over the rear wall 120 and side wall 124.

The chamber 118 has an exit port 126 which is positioned adjacent a port 128 in the side wall 44. These aligned ports allow flux material and air to flow from chamber 118 in a horizontal direction as shown by arrow 130. This exit flow 130 is at right angles to the inlet flow 112.

A housing 132 is mounted within the housing 40 adjacent the port 128. The housing 132 is provided with flanges 134 mounting the housing 132 on the inside of wall 44. Housing 132 defines a chamber 136 and has an inlet port 137 through which the flow 130 enters the chamber 136. The vertical rear wall 138 is positioned directly in the flow path. A resilient material 140 can be attached to the inside of the rear wall 138. The housing 132 has a discharge port 142 which communicates with the interior of the housing 40. Flow from the chamber 136 exits through port 142 in a vertically downward direction as illustrated by arrow 144. This flow 144 is in a downward vertical direction and toward the screen 82.

OPERATION OF THE DEVICE

The advantages and features of the present invention can be more readily understood from a description of the operation of the present device. Initially, the welding apparatus 10 is positioned as desired and the hopper 12 is filled with particulate flux material. The flux is dispensed onto the workpiece 20 by means of conduit 16 and the welding head 22 performs the welding function within the flux environment. A return conduit 24 is positioned adjacent to the weld head and removes the unused flux material and returns the same to the recovery unit 14. The recovery unit 14 is connected to a source of pressurized air 27 and the valve 108 is adjusted to create the desired vacuum within the plenum chamber 102, to in turn control the flow through the return conduit 24 in the direction of arrows 26. Conduit 24 supplies a mixture of air and flux material to the plenum 102 in the direction of arrows 26.

The flow proceeds horizontally through port 110 in the direction of arrow 112 and into the chamber 118. Flow is directed against the vertically-extending rear wall 120. The momentum of the flux material in the flow 112 will cause flux particles to contact the wall 120 and tend to break up the larger particles, which may have been fused togther during the welding process.

The flow then turns at a right angle and exits chamber 118 through port 128 in wall 44 to enter housing 132. The flow entering housing 132 is in the direction of arrow 130 and due to its momentum, the flux particles will contact vertically-extending rear wall 138 to further break up fused flux particles. These flux particles then fall in a vertically-downward direction as shown by arrow 144 and are caused to flow in the direction of screen 82 where they are further broken up by contact with screen 82 before they return into the flux hopper 12.

The resilient material covering the various walls of the housing prevents detrimental abrasive action on the walls by the flux material. The access door 74 allows the addition or removal of flux material to and from the hopper 12. In addition, the screen 82 will prevent the entry of any large particles of slag or other foreign objects into the flux hopper 12.

Gas leaves the housing 40 through the discharge port and conduit 90 and is then filtered by filter bag 92.

Thus, the flux recovery unit of the present invention provides the unit which separates flux from a stream of flowing gas and breaks up the flux particles which have been fused together during the welding process. In addition, large particles or objects are separated from the flux.

Having thus described the present invention, it is to be understood, of course, that other structures could be constructed from the teachings of the present invention without departing from the spirit and scope of the invention as defined by the appended claims.

In the claims:

1. A flux recovery apparatus for attachment to a flux hopper comprising:
 a housing defining a settling chamber, said housing having a flux discharge port at the bottom thereof, mounting means on said housing adjacent said discharge port for mounting said housing on a flux hopper, seal means on said housing around said discharge port, screen means extending across said flux discharge port, said housing having a fill port adjacent the top thereof, closure means for selectively opening and closing said fill port;
 an inlet port for use in connecting a source of pressurized gas to said housing, a valve for controlling the flow of pressurized gas through said inlet port, an inlet port for connecting a flux return conduit to said housing, a plenum chamber formed in said housing connected to said gas and flux inlet ports, a first chamber communicating with said plenum through a first exit port, a vertically-extending wall having a resilient covering thereon positioned transversely in the flow path from said plenum chamber into said first chamber, a second chamber communicating with said first chamber through a second exit port, a second vertically-extending wall having a resilient covering thereon positioned transversely in the flow path from said first chamber into said second chamber, a third exit port formed in said second chamber directing flow from said second chamber in a vertically downward direction into said separation chamber;
 a gas discharge port in said housing positioned in the upper portion thereof and extending horizontally from said housing and filter means connected to said discharge port.

2. A flux recovery apparatus comprising:
 a housing defining a chamber and having an inlet port for receiving a mixture of flux and gas and having separate discharge ports for said flux and said gas;
 means for directing the flow of said mixture through said inlet port and into said chamber in a first direction;
 a first baffle means in the path of flow of said mixture and transverse to the direction of flow; and
 a second baffle means at a right angle to said first baffle means transverse to the direction of flow of said mixture.

3. A flux recovery apparatus as defined in claim 2 additionally comprising a resilient covering for each of said baffle means.

4. A flux recovery apparatus as defined in claim 2 additionally comprising means in said flux discharge port for retaining particles above a given size in said housing.

5. A flux recovery apparatus as defined in claim 4 wherein said retaining means comprises a screen mounted to extend across said flux discharge port.

6. A flux recovery apparatus comprising:
 a housing defining a chamber having an inlet port for a mixture of flux and gas;
 means for directing the flow of said mixture into said chamber in a first direction;
 a screen extending across said chamber;
 deflection means positioned vertically above said screen in said chamber in the path of said entering flow for causing said mixture to flow in a vertically downward direction toward said screen;
 said deflection means coimprising a horizontally extending top wall, a vertically-extending baffle transverse to the direction of the flow of said mixture into said chamber and side walls connecting said top wall and said baffle.

7. The apparatus of claim 6 additionally comprising a second baffle position in the path of the flow of said mixture upstream to said deflecting means and wherein said second baffle extends transverse to the direction of said flow.

8. A flux recovery apparatus as defined in claim 7 additionally comprising resilient means covering said baffle.

9. A method of recovering dispersed flux comprising:
 picking up dispersed flux by creating a vacuum in a conduit;
 mixing the flux in said conduit with gas under pressure to cause a flow of said mixture in a first direction through said conduit;
 transporting said mixture to a central collection area;
 directing the flow of said mixture in a horizontal direction from said conduit into a first chamber and against a first vertically-extending wall;
 directing the flow from said first chamber in a horizontal direction into a second chamber and against a second vertically-extending wall;
 directing the flow from said second chamber in a vertically downward direction and into a third enlarged chamber;
 discharging gases from said third chamber in a horizontal direction from the upper portion thereof; and
 discharging flux from said third chamber in a vertically downward direction.

10. The method of claim 9 additionally comprising the step of screening the flow of flux from said third chamber to remove large particles.

11. The method of claim 9 additionally comprising the step of accelerating the flow to a velocity prior to directing the flow against the first wall.

12. A method of recovering flux from a workpiece, comprising:
 a. removing the flux and other materials from a workpiece after welding;
 b. accelerating the flux to a velocity and sequentially directing the flow of flux against first and second transversely-extending surfaces to thereby break up the larger particles therein;
 c. removing larger particles from said flux; and
 d. returning said flux to a storage hopper.

13. The method of claim 12 wherein removing larger particles from said flux comprises passing said flux through a screen.

14. In combination with a welding apparatus of the type wherein a volume of particulate flux material is contained within a flux hopper, a discharge port for removing flux material from said hopper, a fill port for adding flux material to said hopper, and wherein a flux recovery unit is connected to said hopper to remove flux material from a flux material return line and transfer the flux material to said hopper through a return port, said flux recovery unit having a housing defining a chamber and an inlet port for receiving the flow of a mixture of gas and a flux, means for directing the flow of said mixture in a first direction, the improvement which comprises a planar baffle means in the path of the flow of said mixture and at an angle normal to the direction of flow to thereby break up particles of flux when said particles contact said baffle..

15. The combination of claim 14 additionally comprising a screen means extending across said return port to retain particles above a given size in said recovery unit.

* * * * *